US006867584B1

United States Patent
Kurita et al.

(12) 
(10) Patent No.: US 6,867,584 B1
(45) Date of Patent: Mar. 15, 2005

(54) NON-CONTACT TYPE ROTATION-ANGLE SENSING DEVICE

(75) Inventors: Kazuhisa Kurita, Tokyo (JP); Kenji Nakao, Tokyo (JP); Yoshihiko Onishi, Tokyo (JP); Manabu Miyaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/815,679

(22) Filed: Apr. 2, 2004

(30) Foreign Application Priority Data

Nov. 4, 2003 (JP) .................................... P2003-374173

(51) Int. Cl.[7] ................................................ G01B 7/30
(52) U.S. Cl. .................... 324/207.25; 324/252
(58) Field of Search ............ 324/207.13, 207.2–207.25, 324/235, 244, 252, 259; 73/514.01–514.02, 514.16, 514.31, 514.35, 514.39; 123/612, 617

(56) References Cited

U.S. PATENT DOCUMENTS 6,064,197 A 5/2000 Lochmann et al.

2003/0173954 A1 * 9/2003 Terui et al. ............ 324/207.21
2004/0100252 A1 * 5/2004 Babin ..................... 324/207.25
2004/0104720 A1 * 6/2004 Raminez ................ 324/207.25

FOREIGN PATENT DOCUMENTS

| JP | 6-93921 A | 4/1994 |
| JP | 9-72706 A | 3/1997 |
| JP | 11-94512 A | 4/1999 |
| JP | 2001-317909 A | 11/2001 |

* cited by examiner

*Primary Examiner*—Bot LeDynh
(74) *Attorney, Agent, or Firm*—Sughrue Mion, PLLC

(57) ABSTRACT

In a non-contact type rotation-angle sensing device, a rotation angle sensor (9) having magnetoresistance elements detects a rotation angle of an object to be measured. The object is rotatable round a rotary shaft (2) with respect to the rotation angle sensor (9) and includes a permanent magnet (5, 6). The permanent magnet (5, 6) is disposed symmetrically about said rotary shaft (2) of said object, and a magnetic element (7, 8) is disposed on said object between said permanent magnet (5, 6) and the magnetoresistance elements. In the non-contact type rotation-angle sensing device of above constitution according to the invention, linearity is secured by reducing magnetic hysteresis of the sensor output with respect to the rotation angle, thus a small-sized permanent magnet and reduction in cost being achieved.

10 Claims, 4 Drawing Sheets

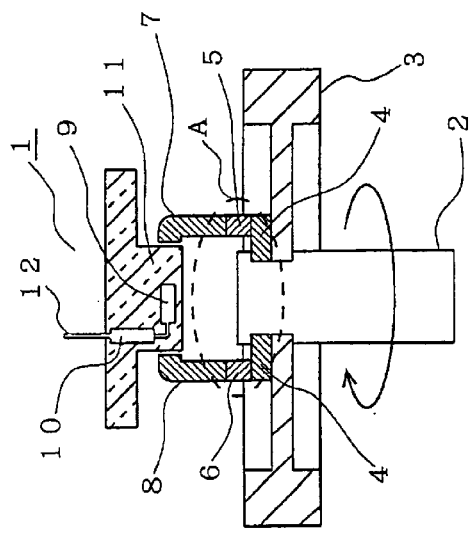
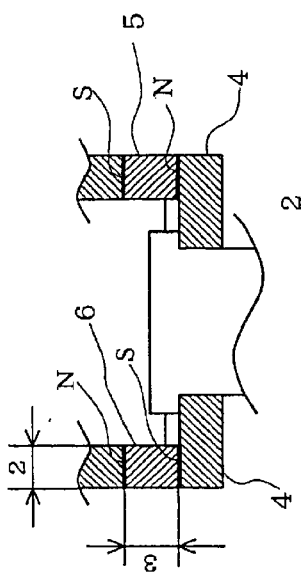
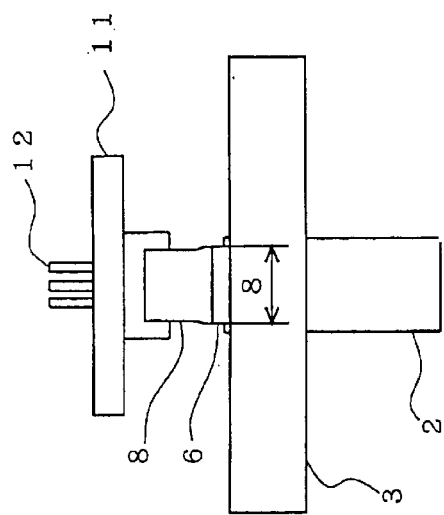

NON-CONTACT TYPE ROTATION-ANGLE SENSING DEVICE

BACKGROUND OF THE INVENTION

1. Field of the Invention

The present invention relates to a non-contact type rotation-angle sensing device that detects a rotation angle of a rotating object to be measured with the use of a permanent magnet and a rotation angle sensor having a magnetoresistance element.

2. Description of the Related Art

Under the background of improvement in durability and higher resolution in detection accuracy, it is a recent trend that rotation-angle sensing devices such as a device for detecting a throttle valve opening of an intake control system of an internal combustion engine have been changed to a non-contact type. Actually various types of non-contact type rotation-angle sensing device have been proposed. It is publicly known that a Hall element or a magnetoresistance element (MR element) is used in non-contact type rotation-angle sensing devices.

In a conventional non-contact type rotation-angle sensing device disclosed in the Japanese Patent Publication (unexamined) No. 1994-93921, plural rotation angle sensors (nonrotatable elements) are arranged facing to permanent magnets (rotatable elements) disposed opposite to each other. In this known arrangement, although a rotation angle sensor output is outputted nonlinearly in case of using only one rotation angle sensor (Hall element), using plural rotation angle sensors makes it possible to secure linearity in such a manner as judging a rotation angle sensor that outputs linearly at a specific angle, thereby switching the output. However, in order to judge the switching and detect the rotation angle, plural rotation angle sensors are required, which results in a problem of increase in cost.

In another conventional non-contact type rotation-angle sensing device disclosed in the Japanese Patent Publication (unexamined) No. 1997-72706, a soft magnetic material (nonrotatable element) having a rotation angle sensor (Hall element) is arranged at the center of permanent magnets (rotatable elements) disposed opposite to each other. It is, however, difficult to stabilize density of magnetic flux passing through the rotation angle sensor through the soft magnetic material when the permanent magnets rotate, and it is not possible to secure linearity. In other words, a problem exists in that the distance between the permanent magnets and the soft magnetic material has no linearity with respect to the rotation angle. Moreover, when the rotating direction is reversed thereby reversing the magnetic flux passing through the soft magnetic material, magnetic hysteresis may cause further deterioration in linearity, which is a further problem.

The Japanese Patent Publication (unexamined) No. 2001-317909 discloses a structure of a conventional non-contact type rotation-angle sensing device. In this conventional sensing device, to secure linearity of density of magnetic flux passing through a rotation angle sensor (Hall element) with respect to the rotation angle, a magnetic circuit is formed in permanent magnets with the use of a rotor core member and a stator core is disposed around the rotation angle sensor. Thus, it is possible to secure the linearity of the density of magnetic flux flowing into the stator core owing to the rotation angle. However, this known device also has a problem of linearity being affected by magnetic hysteresis when the rotating direction is reversed thereby reversing the direction of the passing magnetic flux.

The Japanese Patent Publication (unexamined) No. 1999-94512 discloses a constitution of a further conventional non-contact type rotation-angle sensing device in which a magnetoresistance element (MR element) is used. This magnetoresistance element detects direction of the magnetic flux, thus making it possible to detect the direction of the magnetic flux generated from a permanent magnet (a flux from the N-pole to the S-pole). It is further possible to detect a magnetic flux density on condition that at least the minimum magnetic flux density required for the detection (for example, approximately 0.01 to 0.03 T in case of using NiFe (Permalloy)) is used. This device does not require any magnetic circuit complicated in constitution such as Hall element. Furthermore, it is not necessary to arrange any stator core or magnetic material around the magnetoresistance element. As a result, it is neither necessary to make any magnetic flux flow into the rotation angle sensor (magnetoresistance element) through a stator core or soft magnetic material, nor necessary to cope with the problem of the magnetic hysteresis generated at the time of reversing the rotating direction. However, the most part of the magnetic flux generated from the permanent magnet leaks outside the rotation angle sensor (the magnetoresistance element), and therefore it is essential to use a large size permanent magnet, which results in increase in cost. The permanent magnet is expensive because it is essential to use rare earth metals (such as Sm—Co system and Nd—Fe—B system) of superior heat-resisting property and coercive force as the material of the permanent magnet.

In the case where any non-contact type rotation-angle sensing device is incorporated in an intake control system, a control unit computes necessary engine speed, output, etc. on the basis of rotation angle sensor output. If the rotation angle sensor output is erroneously provided, the engine control becomes unstable, whereby unstable idle rotation, poor fuel efficiency, etc. will occur. In the worst case, there is a likelihood of engine stopping or running out of control. In order to cope with these problems, two rotation angle sensors are used in view of fail-safe operation and, moreover, the non-contact type rotation-angle sensing device itself is undesirably large-sizes eventually resulting in increase in cost.

As discussed above, in any of the conventional non-contact type rotation-angle sensing devices in which a Hall element is used to detect magnetic flux density, it is necessary to arrange a complicated magnetic circuit from the viewpoint of securing the linearity of the change in density of the magnetic flux passing through the sensor with respect to the change in rotation angle. As a result, there remains a problem of magnetic hysteresis generated by the change in magnetic flux due to rotation. In any of the conventional non-contact type rotation-angle sensing device in which a magnetoresistance element is used, it is essential to detect direction of the magnetic flux, and it is possible to detect the angle using the permanent magnet. A problem, however, exists in that it is necessary to use a large size permanent magnet to secure the linearity.

SUMMARY OF THE INVENTION

The present invention was made to solve the above-discussed problems and has an object of obtaining a non-contact type rotation-angle sensing device in which a simple magnetic circuit is arranged employing a permanent magnet and a rotation angle sensor having magnetoresistance elements (MR elements). This non-contact type rotation-angle sensing device secures linearity by removing magnetic hysteresis of the sensor output with respect to rotation angle and achieves small-sized permanent magnet and reduction in cost.

To accomplish the foregoing object, in a non-contact type rotation-angle sensing device according to the invention, a rotation angle sensor having magnetoresistance elements detects a rotation angle of an object to be measured, the object to be measured is rotatable round a rotary shaft with respect to the rotation angle sensor and has a permanent magnet. The mentioned permanent magnet is disposed symmetrically about the mentioned rotary shaft of the mentioned object to be measured, and a magnetic element is disposed on the mentioned object to be measured between the foregoing permanent magnet and the magnetoresistance elements.

In the non-contact type rotation-angle sensing device of above constitution according to the invention, linearity is secured by reducing magnetic hysteresis of the sensor output with respect to the rotation angle, and a small-sized permanent magnet and reduction in cost are achieved.

In another non-contact type rotation-angle sensing device according to the invention, a rotation angle sensor having magnetoresistance elements detects a rotation angle of an object to be measured that is rotatable round a rotary shaft and has a permanent magnet with respect to the foregoing rotation angle sensor. The mentioned permanent magnet is disposed symmetrically about the mentioned rotary shaft of the mentioned object to be measured, and the mentioned magnetoresistance elements are disposed perpendicularly onto an extension line of the foregoing rotary shaft. A magnetic element is disposed on the mentioned object to be measured along a magnetic flux path from the mentioned permanent magnet to the mentioned magnetoresistance elements.

In the non-contact type rotation-angle sensing device of above constitution according to the invention, linearity is secured by reducing magnetic hysteresis of the sensor output with respect to the rotation angle, and a small-sized permanent magnet and reduction in cost are achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1(a), (b) and (c) show respectively a non-contact type rotation-angle sensing device according to Embodiment 1 of the present invention; and in which FIG. 1(a) is a sectional view, FIG. 1(b) is a side view, and FIG. 1(c) is an enlarged view of an essential part of the sectional view in FIG. 1(a).

FIGS. 4(a) and (b) show respectively a non-contact type rotation-angle sensing device according to Embodiment 3, and in which FIG. 4(a) is a sectional view, and FIG. 4(b) is a constitutional view of an essential part.

DETAILED DESCRIPTION OF THE INVENTION

Figure 2:
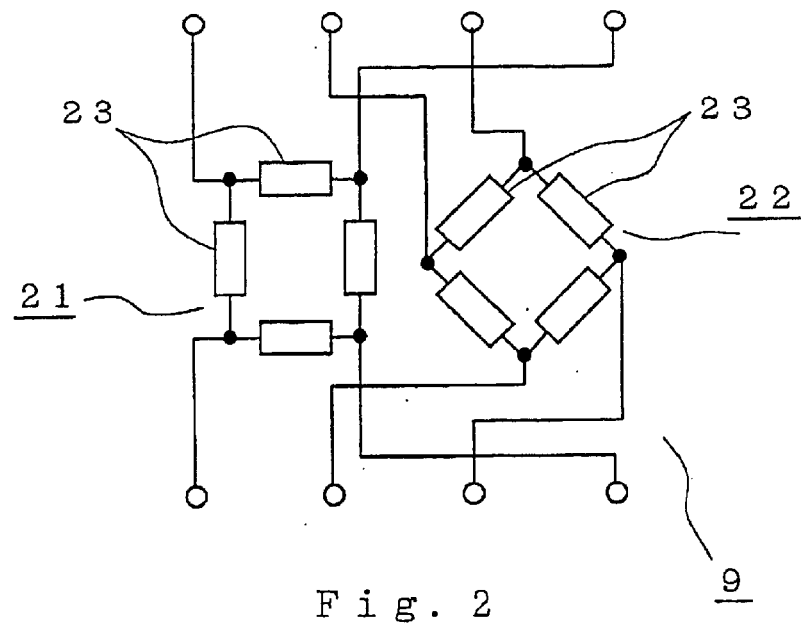
FIG. 2 is a view showing a constitution of an example of a rotation angle sensor having magnetoresistance elements according to Embodiment 1.

Embodiment 1.

Now reference is made to FIG. 1(a) showing a sectional view, FIG. 1(b) showing a side view, and FIG. 1(c) showing an enlarged view of an essential part of the sectional view in FIG. 1(a). In these drawings, a non-contact type rotation-angle sensing device 1 has a rotatable disk 3 (made of a non-magnetic material such as stainless steel) fixed to a rotary shaft 2 (made of a non-magnetic material such as stainless steel). Doughnut-shaped magnetic elements 4, 4 (made of iron such as steel plate) are respectively fixed onto the rotatable disk 3 symmetrically about the rotary shaft 2. Permanent magnets 5 and 6 are respectively fixed onto the two magnetic elements 4 symmetrically about the rotary shaft 2. Strip magnetic elements 7 and 8 (made of iron such as steel plate) are respectively fixed onto the two permanent magnets 5 and 6 symmetrically about the rotary shaft 2. A rotation angle sensor 9 having magnetoresistance elements (MR elements) perpendicular to an extension line of the rotary shaft 2 is disposed in the space between the two strip magnetic elements 7 and 8 to serve as the non-rotatable element side. A non-rotatable element 11 formed by resin-molding the rotation angle sensor 9 and an arithmetic circuit 10 for computing the measured rotation angle on the basis of an output signal of the rotation angle sensor 9 is disposed in the space between the two magnetic elements 7 and 8. Reference numeral 12 designates an output terminal of the arithmetic circuit 10.

A magnetic circuit is formed of the permanent magnet 5, the magnetic elements 4, the permanent magnet 6, the magnetic element 8, the rotation angle sensor 9, and the magnetic element 7. As shown in FIG. 1(c), the polarities of the permanent magnet 5 and the permanent magnet 6 are matched so that direction of the magnetic flux of the permanent magnet 5 coincides with that of the permanent magnet 6 in the magnetic circuit. The magnetic elements 7 and 8 are disposed on the mentioned object to be measured along the magnetic flux path from the permanent magnet to magnetoresistance elements (as well as from the magnetoresistance elements to the permanent magnet on the rotatable element side in the same manner as the permanent magnet 5 and the permanent magnet 6. In the space of the magnetic circuit, constant magnetic flux is generated at all times from the magnetic element 8 to the magnetic element 7.

FIG. 2 is a view showing a constitution of an example of the rotation angle sensor 9 having the magnetoresistance elements. The rotation angle sensor 9 has two measuring bridges 21 and 22 as shown in the Japanese Patent Publication (unexamined) No. 1999-94512, for example. Each of the two measuring bridges 21 and 22 has four magnetoresistance elements 23. Each magnetoresistance element 23 of the measuring bridges 21 and 22 are disposed so as to be at an angle of 90 degrees one another. The two measuring bridges 21 and 22 are disposed so that one is turned by 45 degrees from the other.

The rotation angle sensor 9 is perpendicular to an extension line of the rotary shaft 2, and the extension line of the rotary shaft 2 passes through the center of the rotation angle sensor 9. The magnetoresistance elements of the rotation angle sensor 9 sense magnetic flux of the magnetic field (in other words, direction of the magnetic field) that traverses the magnetoresistance elements in the space between the magnetic elements 7 and 8. Consequently, each of the two measuring bridges 21 and 22 has a sine wave period characteristic of 45 degrees in phase difference. By computing the outputs of the measuring bridges 21 and 22 and composing them by the arithmetic circuit 10, the rotation angle sensor 9 can output linearly within an angular range up to 180 degrees.

The object to be measured such as throttle valve of an intake control system is fixed onto the rotary shaft so that the object to be measured is rotatable round the rotary shaft. The magnetic elements 7 and 8 are disposed on the rotatable element side in the same manner as the permanent magnet 5 and the permanent magnet 6. As a result, constant magnetic flux is generated at all times from the magnetic element 8 to the magnetic element 7 in the space of the magnetic circuit. Rotation of the object to be measured brings change in direction of the magnetic field in the space traversing the rotation angle sensor 9 on the nonrotatable element side. By detecting this change with an output signal of the rotation angle sensor 9, it is possible to detect a rotation angle of the object to be measured.

In the invention, a magnetic circuit is formed so that the permanent magnet 6 (the north pole)→the magnetic element 8 (iron)→space→the rotation angle sensor 9 (the magnetoresistance elements)→space→the magnetic element 7 (iron)→the permanent magnet 5 (the south pole)→the permanent magnet 5 (the north pole)→the magnetic element 4 (iron)→the magnetic element 4 (iron)→the permanent magnet 6 (the south pole) may be the shortest course. This makes it possible to use the magnetic flux generated from the permanent magnets 5 and 6 more effectively for the rotation angle sensor 9. In this case, it is preferable that these permanent magnets are approximately the same configuration as the cross-section of the magnetic circuit. One permanent magnet can be disposed symmetrically about the rotary shaft. However, in the case where the permanent magnet has coercive force smaller than the required magnetic flux of the rotation angle sensor 9, it is also preferable to dispose plural permanent magnets as shown in FIG. 1. The plural permanent magnets are disposed equally on both sides holding the rotation angle sensor 9 (magnetoresistance elements) between them.

The conventional non-contact type rotation-angle sensing devices are not provided with the magnetic elements 7 and 8 on the rotatable element side being different from the invention. Accordingly, the magnetic flux generated from the permanent magnet is formed mainly at the permanent magnet from the N-pole to the S-pole of the permanent magnet. Flow of magnetic flux effective for the detection by the rotation angle sensor is only a limited part of the whole magnetic flux generated from the permanent magnet. (The effective magnetic flux means a flow of magnetic flux that is perpendicular to the rotary shaft and flows from the N-pole to the S-pole of the permanent magnet through the rotation angle sensor.) That is, the most part of the magnetic flux leaks out, and therefore in order to form the minimum magnetic field, it is essential to select a permanent magnet having coercive force several times as much as the minimum magnetic field required for the detection by the rotation angle sensor. Consequently, the conventional devices have disadvantages such as increase in size of the device, increase in cost, and malfunction of another magnetic elements (such as solenoid valve or sensor) located near the devices due to leakage flux from the permanent magnet resulting in interference with the magnetic field of the magnetic device.

However, in the non-contact type rotation-angle sensing device according to the invention, a simple magnetic circuit including the magnetic elements 7 and 8 on the rotatable element side, it is now possible to secure linearity by reducing the magnetic hysteresis of the sensor output with respect to the rotation angle, small size the permanent magnet, and reduce the cost.

The permanent magnet of the conventional non-contact type rotation-angle sensing device is, for example, a piece of 10 mm square and 4 mm in thickness (cubic volume 400 $mm^3$). On the other hand, in the case of the device of equivalent performance in the invention, two permanent magnets each 8 mm×3 mm and 2 mm in thickness (cubic volume 48 $mm^3$×2) are employed, thus a permanent magnet small sized to a quarter is achieved.

Embodiment 2.

Figure 3:
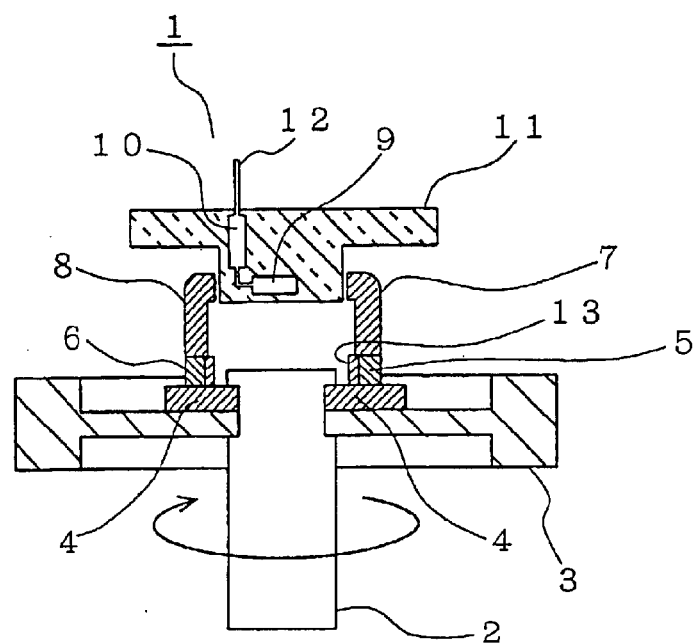
FIG. 3 is a sectional view showing a non-contact type rotation-angle sensing device according to Embodiment 2.

FIG. 3 is a sectional view showing a non-contact type rotation-angle sensing device according to Embodiment 2 of the invention. In the magnetic circuit, magnetic flux flowing from the N-pole to S-pole between the same permanent magnet is generated on a plane parallel to the polarizing direction of the permanent magnets 5 and 6. There is a possibility that the leakage flux therefrom interferes with the space around the rotation angle sensor 9 (magnetoresistance elements). In order to avoid this interference, it is necessary to dispose the rotation angle sensor 9 (magnetoresistance elements) at a distance (calculated specifically by a finite element method, for example) where the rotation angle sensor 9 is free from the influence of the permanent magnets 5 and 6. For that purpose, it is possible to prevent the leakage flux and shorten the distance by disposing a plate-like magnetic element 13 on the face where the leakage takes place.

The plate-like magnetic element 13 (made of iron such as steel plate) is disposed on the rotation angle sensor 9 (magnetoresistance elements) side of the permanent magnet 5, 6 of the object to be measured. As a result, the leakage flux from the permanent magnets 5 and 6 is prevented, and the rotation angle sensor 9 (the magnetoresistance elements) is located nearer the permanent magnets 5 and 6, thus the device is small-sized.

Embodiment 3.

Figure 4:
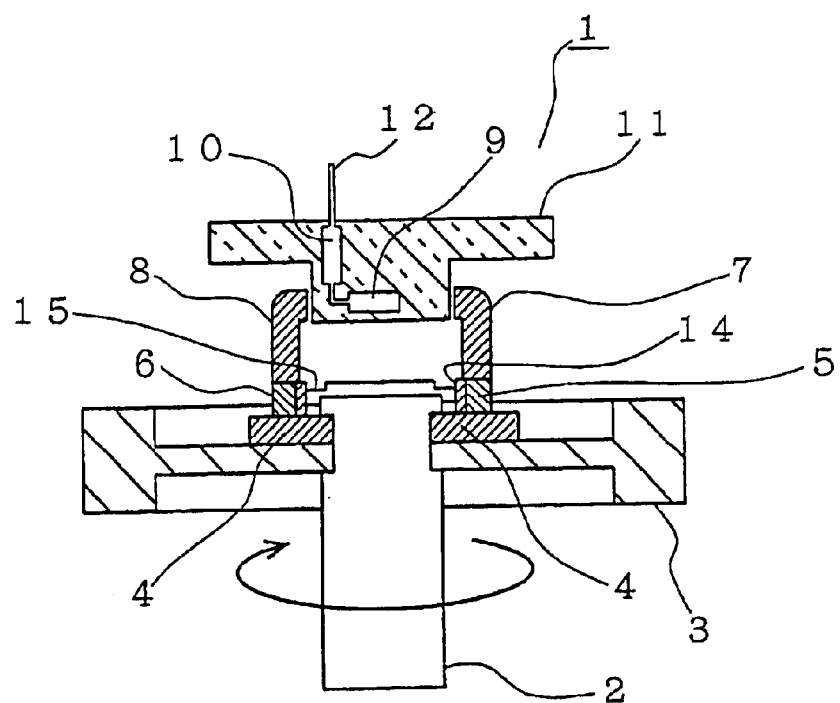
Figure 4:
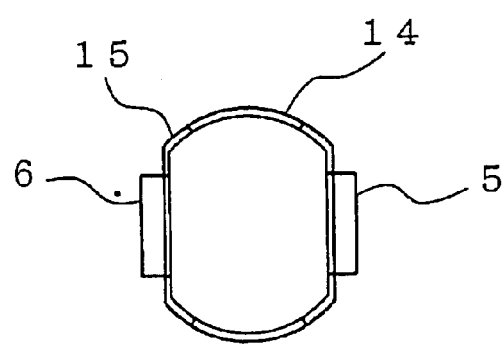

FIGS. 4(*a*) and (*b*) show respectively a non-contact type rotation-angle sensing device according to Embodiment 3 of the invention, and in which FIG. 4(*a*) is a sectional view and FIG. 4(*b*) is a view showing a constitution of an essential part. An annular magnetic element 14 (made of iron such as steel plate) is disposed on the rotation angle sensor 9 (magnetoresistance elements) side of the permanent magnets 5 and 6. The annular magnetic element 14 is partially provided with a notch 15 in order to prevent magnetic flux getting in. Disposing the annular magnetic element 14 makes it possible to control the space and improve assembling efficiency. The annular magnetic element 14 also provides the advantages of the magnetic element 13 in the foregoing Embodiment 2 (i.e., prevention of interference of magnetic flux).

Embodiment 4.

Figure 5:
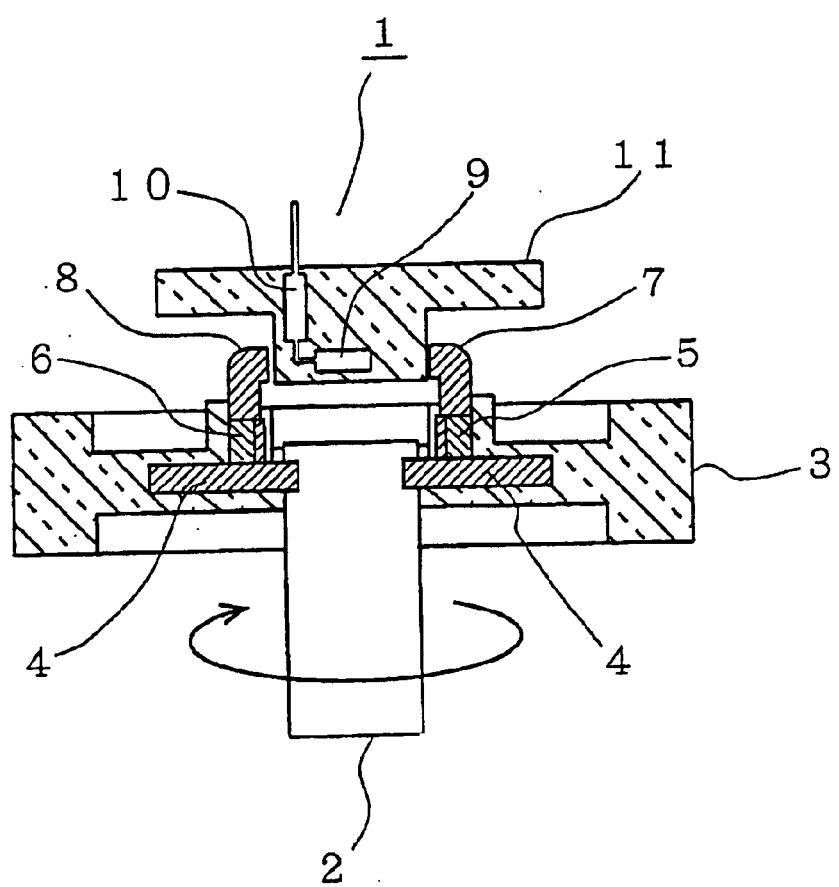
FIG. 5 is a sectional view showing a non-contact type rotation-angle sensing device according to Embodiment 4.

FIG. 5 is a sectional view showing a non-contact type rotation-angle sensing device according to Embodiment 4. In the case where a rotatable disk 3 made of resin is used as a spur gear, a magnetic material is employed as a plate inserted inside for reinforcement. This magnetic material also acts as the magnetic element 4, which makes it possible to reduce number of parts and small size the device.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A non-contact type rotation-angle sensing device in which a rotation angle sensor having magnetoresistance elements detects a rotation angle of an object to be measured, said object to be measured being rotatable round a rotary shaft with respect to the rotation angle sensor and having a permanent magnet, wherein said permanent magnet is disposed symmetrically about said rotary shaft of said object to be measured, and a magnetic element is disposed on said object to be measured between said permanent magnet and the magnetoresistance elements.

2. The non-contact type rotation-angle sensing device according to claim 1, wherein said magnetoresistance elements are resistance elements that detect a direction of magnetic flux, and any magnetic material is not disposed on said rotation angle sensor side between said magnetoresistance elements and said object to be measured.

3. The non-contact type rotation-angle sensing device according to claim 1, wherein plural permanent magnets are used as said permanent magnet disposed symmetrically about said rotary shaft of said object to be measured, and polarity of said permanent magnets is arranged so that magnetic fluxes flow in the same direction in a magnetic circuit formed of said plural permanent magnets and said rotation angle sensor having said magnetoresistance elements.

4. The non-contact type rotation-angle sensing device according to claim 1, wherein a plate-like magnetic element is disposed along a surface of said permanent magnet of said object to be measured in the polarizing direction on said rotation angle sensor side.

5. The non-contact type rotation-angle sensing device according to claim 4, wherein the magnetic element disposed along the surface of said permanent magnet in the polarizing direction on said rotation angle sensor side is common to said plural permanent magnets, partially provided with a notch and annular.

6. A non-contact type rotation-angle sensing device in which a rotation angle sensor having magnetoresistance elements detects a rotation angle of an object to be measured, said object to be measured being rotatable round a rotary shaft and having a permanent magnet with respect to the rotation angle sensor, wherein said permanent magnet is disposed symmetrically about said rotary shaft of said object to be measured, and said magnetoresistance elements are disposed perpendicularly onto an extension line of said rotary shaft, and a magnetic element is disposed on said object to be measured along a magnetic flux path from said permanent magnet to said magnetoresistance elements.

7. The non-contact type rotation-angle sensing device according to claim 6, wherein said magnetoresistance elements are resistance elements that detect a direction of magnetic flux, and any magnetic material is not disposed on said rotation angle sensor side between said magnetoresistance elements and said object to be measured.

8. The non-contact type rotation-angle sensing device according to claim 6, wherein plural permanent magnets are used as said permanent magnet disposed symmetrically about said rotary shaft of said object to be measured, and polarity of said permanent magnets is arranged so that magnetic fluxes flow in the same direction in a magnetic circuit formed of said plural permanent magnets and said rotation angle sensor having said magnetoresistance elements.

9. The non-contact type rotation-angle sensing device according to claim 6, wherein a plate-like magnetic element is disposed along a surface of said permanent magnet of said object to be measured in the polarizing direction on said rotation angle sensor side.

10. The non-contact type rotation-angle sensing device according to claim 9, wherein the magnetic element disposed along the surface of said permanent magnet in the polarizing direction on said rotation angle sensor side is common to said plural permanent magnets, partially provided with a notch and annular.

* * * * *